United States Patent
Qiu et al.

(10) Patent No.: US 9,541,211 B2
(45) Date of Patent: Jan. 10, 2017

(54) THERMOREGULATOR AND THERMOREGULATOR COMPONENT

(71) Applicant: ZHEJIANG SANHUA AUTOMOTIVE COMPONENTS CO., LTD., Hangzhou, Zhejiang (CN)

(72) Inventors: Haoming Qiu, Hangzhou (CN); Bin Yin, Hangzhou (CN); Jianmin Zhang, Hangzhou (CN); Hui Wang, Hangzhou (CN)

(73) Assignee: Zhejiang Sanhua Automotive Components Co., Ltd., Hangzhou (CN)

(*) Notice: Subject to any disclaimer, the term of this patent is extended or adjusted under 35 U.S.C. 154(b) by 99 days.

(21) Appl. No.: 14/419,919

(22) PCT Filed: Jul. 22, 2013

(86) PCT No.: PCT/CN2013/079773
§ 371 (c)(1),
(2) Date: Feb. 5, 2015

(87) PCT Pub. No.: WO2014/023156
PCT Pub. Date: Feb. 13, 2014

(65) Prior Publication Data
US 2015/0204453 A1    Jul. 23, 2015

(30) Foreign Application Priority Data

Aug. 7, 2012  (CN) .......................... 2012 1 0280602
Aug. 7, 2012  (CN) .......................... 2012 1 0280614
(Continued)

(51) Int. Cl.
*F16K 17/38*    (2006.01)
*F16K 31/00*    (2006.01)
(Continued)

(52) U.S. Cl.
CPC ............... *F16K 31/002* (2013.01); *F16K 3/30* (2013.01); *G05D 23/1333* (2013.01); *F16H 57/04* (2013.01)

(58) Field of Classification Search
CPC ...... F16K 31/002; F16K 3/30; G05D 23/1333; F16H 57/04
(Continued)

(56) References Cited

U.S. PATENT DOCUMENTS 2,268,359 A * 12/1941 Tustin ................... F16K 17/003
                                                              137/468
4,190,198 A    2/1980 Casuga et al.
(Continued)

FOREIGN PATENT DOCUMENTS

CN    1231381 A    10/1999
CN    1696553 A    11/2005
(Continued)

OTHER PUBLICATIONS

Chinese Office Action, dated Jul. 3, 2015, from a corresponding Chinese Application No. 201210280625.9.
(Continued)

*Primary Examiner* — John K Fristoe, Jr.
*Assistant Examiner* — P. Macade Nichols
(74) *Attorney, Agent, or Firm* — Wolf, Greenfield & Sacks, P.C.

(57) ABSTRACT

A thermostatic valve includes a housing and a thermostatic actuating element, and the thermostatic actuating element includes a main body in which a thermosensitive substance is provided. The housing has an open end which is closed by a cap assembly. The thermostatic valve includes a first elastic element and a second elastic element, wherein the first elastic element is provided at a side of the cap assembly, and has one end abutting against the cap assembly, and (Continued)

another end directly abutting against or indirectly abutting against the piston at least during a moving process; the second elastic element is provided at a side of the third port, and has one end abutting against an inner wall or a bottom wall of the cavity of the housing, and another end abutting against the main body.

20 Claims, 9 Drawing Sheets

(30) Foreign Application Priority Data

Aug. 7, 2012 (CN) .......................... 2012 1 0280623
Aug. 7, 2012 (CN) .......................... 2012 1 0280624
Aug. 7, 2012 (CN) .......................... 2012 1 0280625

(51) Int. Cl.
  *F16K 3/30* (2006.01)
  *G05D 23/13* (2006.01)
  *F16H 57/04* (2010.01)

(58) Field of Classification Search
  USPC ................................................ 137/468, 471
  See application file for complete search history.

(56) References Cited

U.S. PATENT DOCUMENTS

| | | | |
|---|---|---|---|
| 6,138,617 | A | 10/2000 | Kuze |
| 6,253,837 | B1 | 7/2001 | Seiler et al. |
| 2005/0145706 | A1 | 7/2005 | Cardinali Ieda |
| 2006/0016900 | A1 | 1/2006 | Brown et al. |
| 2006/0108435 | A1 | 5/2006 | Kozdras et al. |
| 2011/0005741 | A1 | 1/2011 | Sheppard |
| 2012/0055565 | A1 | 3/2012 | Kanzaka et al. |

FOREIGN PATENT DOCUMENTS

| | | |
|---|---|---|
| CN | 201259006 Y | 6/2009 |
| CN | 101509560 A | 8/2009 |
| CN | 201475421 U | 5/2010 |
| CN | 101738027 A | 6/2010 |
| CN | 102224367 A | 10/2011 |
| CN | 202091556 U | 12/2011 |
| CN | 102312997 A | 1/2012 |
| CN | 102312998 A | 1/2012 |
| CN | 102359576 A | 2/2012 |
| CN | 102359577 A | 2/2012 |
| CN | 102449570 A | 5/2012 |
| CN | 102472407 A | 5/2012 |
| GB | 770945 A | 3/1957 |
| JP | 2000310461 A | 11/2000 |
| JP | 2003166670 A | 6/2003 |
| WO | WO 99/15767 A1 | 4/1999 |

OTHER PUBLICATIONS

Chinese Office Action, dated Feb. 16, 2016, from a corresponding Chinese Application No. 201210280625.9.
Chinese Office Action, dated Sep. 6, 2015, from a corresponding Chinese Application No. 201210280623.X.
Chinese Office Action, dated Sep. 21, 2015, from a corresponding Chinese Application No. 201210280602.8.
Chinese Office Action, dated Sep. 22, 2015, from a corresponding Chinese Application No. 201210280624.4.
Chinese Office Action, dated Apr. 29, 2016, from a corresponding Chinese Application No. 201210280614.0.
Extended European Search Report, dated Jun. 7, 2016, from a related European Application No. 13828032.6.
International Search Report dated Oct. 24, 2013 from corresponding International Application PCT/CN2013/079773.
International Search Report dated Oct. 31, 2013 from potentially related International Application No. PCT/CN2013/079778.

* cited by examiner

THERMOREGULATOR AND THERMOREGULATOR COMPONENT

This application is the national phase of International Application No. PCT/CN2013/079773, titled "THERMOREGULATOR AND THERMOREGULATOR COMPONENT", filed on Jul. 22, 2013, which claims the benefit of priorities to Chinese patent application No. 201210280602.8 titled "THERMOSTATIC VALVE FOR HEAT EXCHANGING CIRCUIT" and filed with the Chinese State Intellectual Property Office on Aug. 7, 2012;

Chinese patent application No. 201210280614.0 titled "THERMOSTATIC VALVE FOR HEAT EXCHANGING CIRCUIT" and filed with the Chinese State Intellectual Property Office on Aug. 7, 2012;

Chinese patent application No. 201210280623.X titled "CAP ASSEMBLY FOR THERMOSTATIC VALVE" and filed with the Chinese State Intellectual Property Office on Aug. 7, 2012;

Chinese patent application No. 201210280624.4 titled "THERMOSTATIC VALVE FOR HEAT EXCHANGING CIRCUIT" and filed with the Chinese State Intellectual Property Office on Aug. 7, 2012; and Chinese patent application No. 201210280625.9 titled "THERMOSTATIC VALVE FOR HEAT EXCHANGING CIRCUIT" and filed with the Chinese State Intellectual Property Office on Aug. 7, 2012. The entire disclosures of all applications are incorporated herein by reference.

TECHNICAL FIELD

The present application relates to the mechanical field, and in particular to a control assembly for regulating the temperature of a heat exchanging circuit.

BACKGROUND

During the running process of an automobile, lubricating oil is required to be supplied to various components timely to guarantee the normal operation of the automobile. If the lubricating performance of the lubricating oil is not good enough, the service life of the automobile will be affected, and even a traffic accident may be caused. The lubricating performance of the lubricating oil is significantly associated with its temperature, and the lubricating performance of the lubricating oil will be affected when the temperature of the lubricating oil is too high or too low.

During the normal operation of the automobile, the temperature of the lubricating oil generally won't be too high, and when the automobile runs under overload, runs on a snowfield or runs off-road in a four-wheel driving mode, or runs when a hydraulic torque converter slips excessively, the transmission oil may have an overly high temperature, thus losing the lubricating performance.

Conventionally, the temperature of the transmission oil is mainly regulated by a cooling flow path composed of a thermostatic valve and an oil cooler. When the temperature of the transmission oil rises, a thermosensitive substance in a thermostatic actuating element is heated to expand, a passage which allows the transmission oil directly flows back into the transmission is closed, and the high-temperature oil flows into the oil cooler to be cooled and then flows back to the transmission. When the temperature of the oil is too low, the thermosensitive substance in the thermostatic actuating element is solidified and contracted, a piston is reset, and the passage which allows the transmission oil directly flows back into the transmission is opened. During the flowing process, the oil in the transmission oil path exchanges heat with heat-generating components in the transmission, thus the temperature of the oil gradually rises, and the thermosensitive substance of the thermostatic valve gradually expands.

If the thermostatic valve is not provided, the passage for the transmission oil flowing into the oil cooler is always opened, which may increase oil consumption under low temperature and affect the service life of the transmission. Hence, in practical application, when the temperature of oil is lowered to a certain extent, it is not desirable that the transmission oil enters into the oil cooler, or only a few of transmission oil is allowed to enter into the oil cooler. The situation that oil enters into the oil cooler when a flow path of cooling liquid is cut off is referred to as an internal leakage. In the conventional technology, the pressure inside the oil cooler is used to prevent the transmission oil from entering into the oil cooler. Due to differences between various systems, the requirements on the internal leakage of the thermostatic valve are different, and the internal leakage degree of the existing thermostatic valve cannot meet the requirements in the practical application in some cases. Additionally, the existing thermostatic valve is generally connected to the oil cooler of the system by a connecting pipe provided on the thermostatic valve, and in order to flow into the cooler, the oil flowing out of the thermostatic valve has to flow through the connecting pipe firstly.

SUMMARY

An object of the present application is to provide a thermostatic valve having a new structure, which has a relatively simple structure design, is easier to produce and assemble. A thermostatic valve assembly for controlling the oil temperature of a transmission is further provided which is convenient to mount and occupies a small space.

A thermostatic valve is provided according to the present application, and includes a housing in which a cavity is provided, and a thermostatic actuating element mounted in the cavity, wherein the thermostatic actuating element includes a main body in which a thermosensitive substance is provided; the thermostatic valve further includes a piston slidably mounted at one end of the main body, and one end of the piston protrudes out of the main body. The housing further includes three ports, including a first port, a second port and a third port, wherein the first port is in communication with the second port through the cavity, and the third port is selectively in communication with the first port and the second port; the housing is provided with an open end which is closed by a cap assembly; the thermostatic valve further includes a first elastic element and a second elastic element. The first elastic element is provided on the cap assembly or at a side close to the cap assembly, and the first elastic element has one end abutting against the cap assembly, and another end directly abutting against or indirectly abutting against the piston at least during a moving process; the second elastic element is provided at the third port or at a side close to the third port, and the second elastic element has one end abutting against an inner wall or a bottom wall of the cavity of the housing, and another end abutting against the main body. An initial deformation force of the first elastic element is greater than or equal to a pressure applied to the second elastic element when the main body abuts against the housing at a portion where the third port is provided. In a case that the thermostatic actuating element is heated, the thermosensitive substance expands, and after the piston directly abuts against or indirectly abuts against the first elastic element, the main body is moved with respect to the piston, that is moving towards the third port, until an abutting portion of the main body abuts against an end surface of the housing at a portion where the third port is provided, and then the piston compresses the first elastic element and moves towards the cap assembly.

The cap assembly is provided with an open end as a receiving portion, the open end faces the cavity of the housing, and the first elastic element is provided in the receiving portion of the cap assembly. The cap assembly includes a spring seat, and a position limiting portion which is axially positioned. The position limiting portion is arranged at the open end of the cap assembly at a position close to an end portion of the open end; the other end of the first elastic element abuts against the spring seat, a surface of the spring seat that is away from the receiving portion is in pressingly contact with the position limiting portion or the piston. During the moving process, the piston is in contact with the first elastic element via the spring seat.

The cap assembly includes a cap, a retainer ring and a spring seat; the open end of the housing is sealed by the cap, and the cap is retained in a groove of the open end of the housing through a snap ring. An end of the cap that faces the cavity is opened to form the receiving portion, and the first spring element and the spring seat are provided in the receiving portion; the position limiting portion is the retainer ring which is provided at the open end of the cap and is axially limited with respect to the cap via a groove provided in the open end of the cap. The spring seat has a flat plate shape or a straw hat shape, and in a case that the spring seat has the flat plate shape, the piston abuts against a flat surface of the flat plate shape during the moving process; and in case that the spring seat has the straw hat shape, an end portion of the protruding end of the piston is located in an inwardly concave cavity of the spring seat. The spring seat is provided with a though hole or a notch.

The cap assembly includes a cap, a retaining member and a spring seat; an end of the cap that faces the cavity is opened. The spring seat has a straw hat shape, and is provided with a though hole or a notch. The retaining member has an approximately cylindrical shape with two open ends, and the retaining member has an integrated structure with a position limiting portion. The retaining member is provided at the open end of the cap and is fixedly connected to the cap through threads to form the receiving portion, and the first elastic element and the spring seat are arranged in the receiving portion; and the first elastic element has one end pressingly connected to a bottom wall of the open end of the cap, and another end pressingly connected to an abutting surface of the spring seat, and the spring seat is in pressingly contact with the position limiting portion or the piston.

A passage is provided in the housing to communicate the third port with a corresponding external port. A retaining member is provided on the main body, and the retaining member is integrally formed with the main body or fixedly provided on the main body, the retaining member protrudes out of a base portion of the main body, the abutting portion of the main body is a flat surface of the retaining member that faces the third port. The main body abuts against the portion where the third port is located refers to that the retaining member abuts against a flat surface portion of an end surface where an inward valve opening of the third port is located, to close the third port and separate the external port in communication with the third port from the first port and the second port.

A passage is provided in the housing to communicate the third port with a corresponding external port. The main body of the thermostatic actuating element is provided with a spring mounting portion at a second end, a flat surface portion is provided between an outer side wall of the main body and the spring mounting portion and functions as an abutting portion. The spring mounting portion is configured to radially limit the second elastic element, and a planar contacting portion of the abutting portion on the main body is configured to axially limit the second elastic element. A diameter of the outer side wall of the main body is greater than an inner diameter of the third port, and outer diameters of the second elastic element and the spring mounting portion are both smaller than the inner diameter of the third port. The second elastic element has one end mounted on the spring mounting portion, and another end extending into the third port of the housing and in pressingly contact with an inner wall or a bottom wall of the housing. When the abutting portion of the main body abuts against a portion where an inward end surface of the third port is located, the third port is closed by the main body, and the external port in communication with the third port is separated from the first port and the second port.

A passage is provided in the housing to communicate the third port with a corresponding external port. The main body has a stepped cylindrical shape, and an outer diameter of a first end of the main body is greater than an outer diameter of a second end of the main body. The second elastic element is sleeved on the second end of the main body of the thermo-actuated element, a diameter of an outer side wall of the second end of the main body is greater than an inner diameter of the third port, the second elastic element has one end abutting against a stepped shoulder portion formed between the first end and the second end of the main body, and another end in pressingly contact with an inner wall of the housing at a position where the third port is located. A circumferential side of an end portion of the second end of the main body is chamfered or the end portion of the second end of the main body is a frustum. An end portion, facing the third port, of the second end of the main body functions as the abutting portion; and in a case that the thermostatic actuating element is heated, when the abutting portion of the main body abuts against a portion where an inward valve opening of the third port is located, the third port is closed by the main body, and the external port in communication with the third port via the passage is separated from the first port and the second port.

A distance from a bottom of the third port to a bottom of the passage is A, a diameter of the passage is B, and the relationship between A and B satisfies the expression: $A/B \geq 1/16$. A radius of the third port may be greater than a radius of the passage.

A thermostatic valve assembly is further provided according to the present application, and includes a thermostatic valve, a connector and a fluid cooler. The thermostatic valve is fixedly connected to the fluid cooler via the connector. The connector includes a mating portion, a surface of a side of the mating portion that is connected to the fluid cooler has a shape matching with a shape of a corresponding fitting mounting part of the fluid cooler. The connector is hermetically fixed to the fluid cooler by welding, and the thermostatic valve is fixedly connected to the connector through a bolt, to fixedly connect the thermostatic valve to the fluid cooler. The thermostatic valve can employ any one of the above-described thermostatic valves. In this way, unlike the conventional thermostatic valve using the pipelines for connection, the mounting manner of the thermostatic valve in the present application is convenient and efficient. In addition, the thermostatic valve in the present application is mounted via the connector, and is convenient to mount and easy to implement, and can meet the operational requirements on sealing.

The connector is provided with two connecting through holes, and the two connecting through holes include a first hole and a second hole. A side of the connector that is connected to the fluid cooler is provided with connecting pipes connecting the fluid cooler with the connector, and the connecting pipes include a first pipe and a second pipe; the first pipe and the second pipe are both metal pipes, one end of the first pipe is fixedly mounted at a right end of the first hole, one end of the second pipe is fixedly mounted at a right end of the second hole, and after the first pipe and the second pipe are inserted into the connector, the first pipe and the second pipe are internally expanded to be fixed.

The connector and the fluid cooler are fixedly connected via a bracket fixedly provided on the fluid cooler; the surface of the side of the mating portion of the connector that is connected to the fluid cooler is arc shaped, a radius of the arc shape is 0.2 to 0.4 mm greater than a radius of a corresponding arc portion of the bracket fixed on the fluid cooler. During assembling, the connector is first fixedly mounted on the bracket by arranging the arc mating surface of the mating portion of the connector close to a connecting surface of the bracket, fixing the mating surface to the connecting surface of the bracket by welding, and fixing the first pipe and the second pipe to the bracket or the fluid cooler by welding.

For the thermostatic valve according to the present application, the first elastic element is provided at one side of the piston, which avoids the following problems. When the first elastic element is provided on the main body of the thermo-actuated element, the design requirement is high, and since the third port is sealed by a movable element, the operating performance of the thermostatic valve may be lowered when the fluid leakage inside the thermostatic valve is too high. Therefore, by providing the first elastic element at one side of the piston, the fluid leakage inside the thermostatic valve can be effectively controlled and the control of the oil temperature of the transmission is improved. In addition, the requirement on manufacturing accuracy of the parts can be lowered, and it is more convenient to manufacture and assemble.

DETAILED DESCRIPTION

A thermostatic valve according to the present application is mainly used to control the transmission oil temperature of a transmission of an automobile. The thermostatic valve is in communication with an oil path of the transmission and is also connected to a fluid cooler (such as an oil cooler) for cooling the transmission oil. In actual use, a thermosensitive substance in a thermostatic actuating element of the thermostatic valve expands or contracts according to the oil temperature of the thermostatic valve so as to control the amount of transmission oil entering into the fluid cooler, and to control the operating temperature of the transmission oil in the transmission within an effective range, avoid the temperature of the transmission oil from being too high or too low, thereby ensuring the lubricating to have a better lubricating performance, and ensuring the normal operation of the transmission. The thermostatic valve according to the present application is especially adapted to control the temperature of transmission oil of a new type multi-speed transmission. Hereinafter, embodiments of the thermostatic valve assembly and the thermostatic valve for a heat exchanging circuit according to the present application will be described in detail in conjunction with accompanying drawings.

In the specification, terms indicating direction or position, such as "top", "bottom", "left", "right", "upper", "lower" and so on, are all illustrated on a basis of the relationship of up, down, left and right of the drawings and are used to make the description more clear. An initial deformation force of a first spring 203 referred to in the specification indicates a pressure applied to the first spring 203, i.e., an elastic force of the first spring 203, in a state that a retainer ring 121 is just no longer subjected to the pressure from the first spring 203 when the first spring 203 generates compression deformation when subjected to a pressure from a piston 205.

Figure 4:
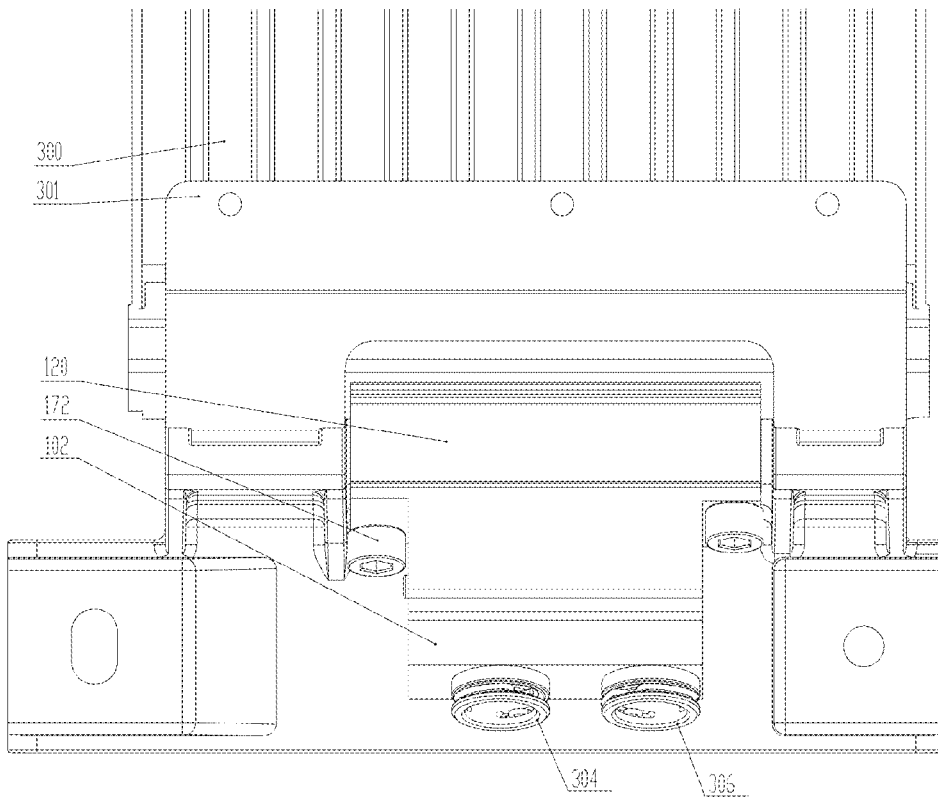
FIG. 4 is a front schematic view showing a partial structure of the first embodiment of the thermostatic valve assembly according to the present application.
Figure 5:
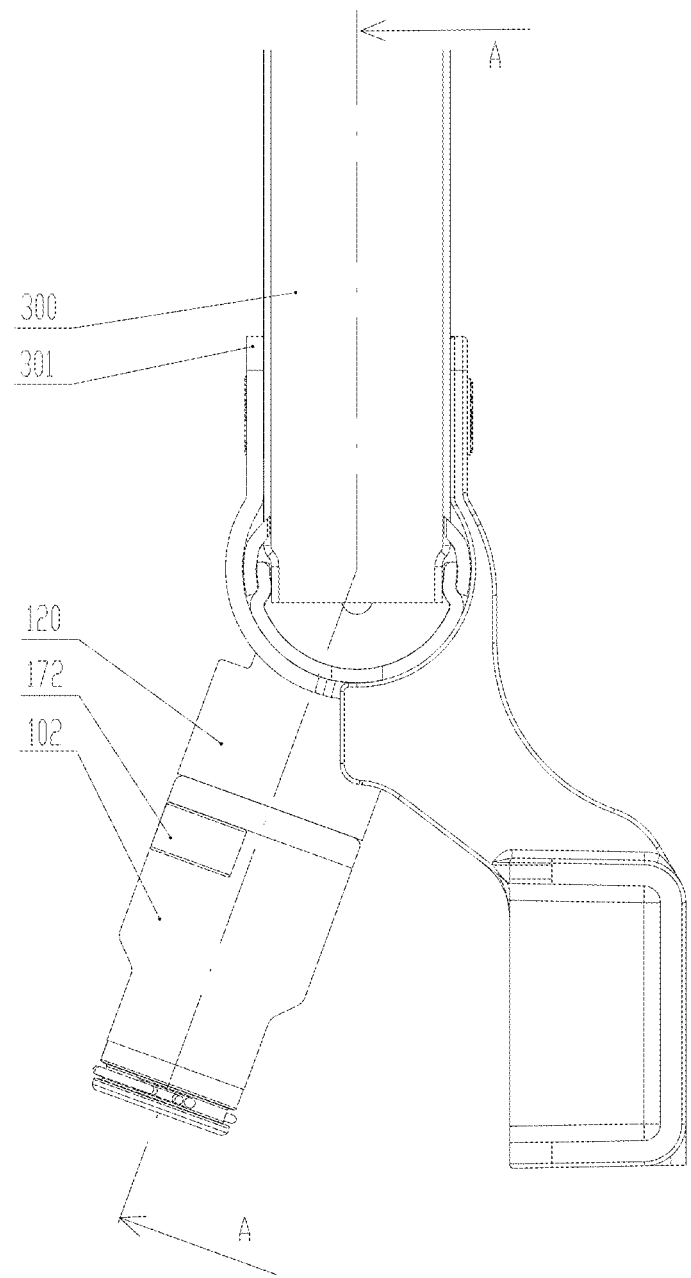
FIG. 5 is a left view of the thermostatic valve assembly shown in FIG. 4.
Figure 6:
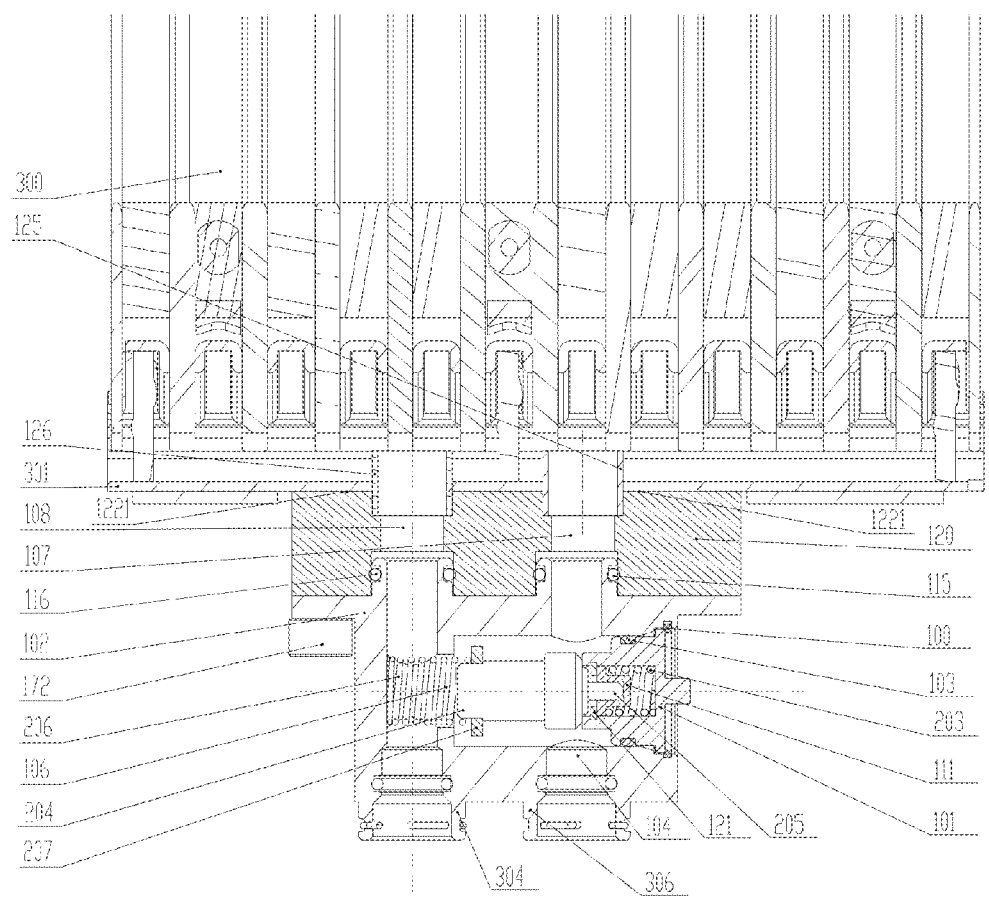
FIG. 6 is a sectional view of the thermostatic valve assembly shown in FIG. 5 taken along line A-A.
Figure 7:
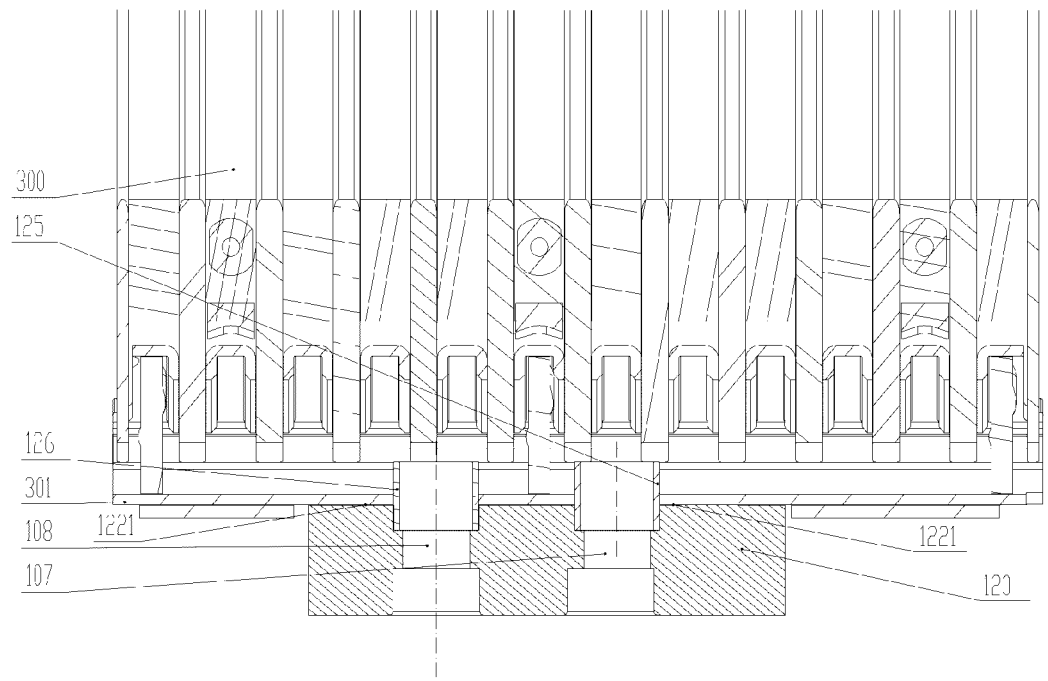
FIG. 7 is a sectional schematic view showing the connector being mounted on a fluid cooler in the thermostatic valve assembly shown in FIG. 6.

As shown in FIGS. 1 to 7, the thermostatic valve assembly for the heat exchanging circuit according to the present application includes a thermostatic valve, a connector 120 and a fluid cooler 300. The thermostatic valve is fixedly connected to the fluid cooler 300 via the connector 120. As shown in FIG. 4, in this embodiment, the connector 120 is hermetically and fixedly connected to the fluid cooler 300 by welding; and the thermostatic valve is fixedly connected to the connector 120 via a bolt 172, thereby connecting the thermostatic valve with the fluid cooler 300. In practical application, the thermostatic valve and the connector can be fixedly connected in other manners, such as clamping.

The connector 120 can be connected to the fluid cooler 300 via a bracket 301 provided on the fluid cooler 300, thus the connector 120 can be fixedly mounted by the bracket 301. In addition, in a case that a connecting pipe which can realize a fixed connection is provided on the fluid cooler 300, the connector can also be directly fixed to the connecting pipe by welding, thus the bracket can be omitted.

In this embodiment, the thermostatic valve includes a housing 102 provided with a cavity 112, and a thermostatic actuating element fitted in the cavity 112. The thermostatic actuating element includes a main body 204 in which a thermosensitive substance is provided. The thermostatic valve further includes the piston 205, the piston 205 is mounted at one end of the main body 204 and is slidable with respect to the main body 204, and the piston 205 has one end protruding out of the main body 204. When the thermosensitive substance is heated to expand, the piston 205 slides with respect to the main body 204 under the action of an expansion force of the thermosensitve substance. The housing 102 further includes three ports, including a first port 104, a second port 105 and a third port 106. The first port 104 is in communication with the second port 105 through the cavity 112, and a port which can be selectively opened is provided between the third port 106 and both of the first port 104 and the second port 105, the port herein refers to an opening at an inward end of the third port, and the expression of "inward" indicates a direction towards an inner cavity where the thermostatic actuating element is provided; or, the port can also refer to an opening of an end of the third port that is close to the cavity where the thermostatic actuating element is provided. One side of the housing 102 is provided with external ports in communication with the second port 105 and the third port 106, respectively, so as to facilitate mounting and connecting the housing 102 to the fluid cooler. Correspondingly, the connector 120 is provided with two through holes for connection, including a first hole 107 and a second hole 108, and the external ports of the housing 102 are hermetically connected to the first hole 107 and the second hole 108, respectively. A first sealing ring 115 and a second sealing ring 116 are provided at outer sides of the external ports, respectively, thereby maintaining the sealing of communicating passages between the external ports of the housing and the first hole 107 and the second hole 108 of the connector. Furthermore, the other ends of the first hole 107 and the second hole 108 of the connector are connected to an inlet and an outlet of the fluid cooler, respectively, and the first hole 107 is in communication with the outlet of the fluid cooler, and the second hole 108 is in communication with the inlet of the fluid cooler. Moreover, the first hole 107 and the second hole 108 can also be configured to communicate with the inlet and the outlet of the fluid cooler in a reverse manner.

Figure 1:
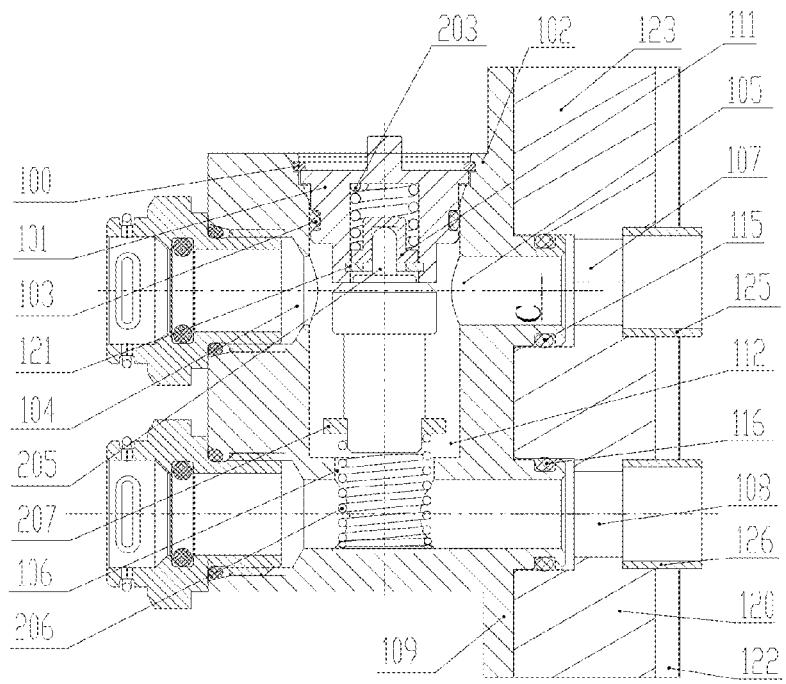
FIG. 1 is a sectional structural schematic view showing an assembling portion of a thermostatic valve and a connector according to a first embodiment of a thermostatic valve assembly of the present application, wherein a third port of the thermostatic valve is in a full open state.

The other side of the housing 102 is provided with two ports in communication with the first port 104 and the third port 106, respectively, for achieving the communication with an inlet and an outlet of the oil path of the transmission. For facilitating connection, in this embodiment, the ports are further provided with corresponding connecting elements, including a first connecting element 304 for mating with the first port 104 and a second connecting element 306 for mating with the third port 106. The first connecting element 304 and the second connecting element 306 are connected to the inlet and the outlet of the oil path of the transmission, respectively. The first connecting element 304 and the second connecting element 306 can be integrally formed with the housing 102 by machining, or can be fixedly connected to the housing 102 by threaded connection, bayonet connection, and etc. In FIG. 1, the connecting elements are connected to the housing by threaded connection; and in FIG. 6, the connecting elements are integrally formed with the housing. With the integrated structure, the dimension of the outer contour of the thermostatic valve can be reduced, which reduces the volume of the space required for mounting the thermostatic valve, and the risk of fluid leakage in the structure that the connecting elements and the housing are fixedly connected, thus the shock resistance is also improved. By employing the threaded connection or the bayonet connection, the material used during manufacturing can be reduced, and the components can be assembled together.

Furthermore, the side of the connector 120 that is connected to the fluid cooler is provided with connecting pipes for connecting the fluid cooler with the connector 120, and the connecting pipes include a first pipe 125 and a second pipe 126. The first pipe 125 and the second pipe 126 are both metal pipes, one end of the first pipe 125 is fixedly mounted at a right end of the first hole 107, one end of the second pipe 126 is fixedly mounted at a right end of the second hole 108, and after the first pipe 125 and the second pipe 126 are inserted into the connector, the first pipe 125 and the second pipe 126 are internally expanded to be fixedly connected to the connector.

The connector 120 includes a connecting portion 123 and a mating portion 122. The connecting portion 123 has a substantially rectangular shape and is configured to be fixedly connected to the thermostatic valve. A surface of a side, configured to be connected to the fluid cooler, of the mating portion 122 of the connector 120 has a shape matching with that of a corresponding part of the fluid cooler, thus mounting surfaces of the connector and the fluid cooler can fit with each other when they are connected. In this embodiment, the connector 120 is fixedly mounted on the fluid cooler via the bracket 301, therefore the shape of the surface of the side, configured to be connected to the fluid cooler, of the mating portion 122 of the connector 120 matches with the shape of a corresponding part of the bracket 301. The mating portion 122 of the connector 120 is an arc surface, a radius of the arc is 0.2 to 0.4 mm greater than a radius of an arc of the corresponding part of the bracket 310 on the fluid cooler. During assembling, the connector 120 is first fixedly mounted on the bracket 301, and the connector 120 can be fixedly connected to the bracket 301 by welding. In detail, in this embodiment, an arc mating surface 1221 of the connector 120 is placed close to a connecting surface of the bracket 301, and then the connector 120 and the bracket 301 are fixed by welding, and at the same time, the first pipe 125 and the second pipe 126 are also fixed to the bracket 301 or the fluid cooler by welding, therefore, the fixed connection of the connector is more reliable. Moreover, the fixed connection of the connector can also be achieved by other ways, such as snap fit, threaded connection. After the connector is fixedly mounted, the thermostatic valve is fixedly connected to the connector. In this case, the thermostatic valve is arranged close to the fluid cooler, thus the thermostatic valve and the fluid cooler no longer need to be connected through pipelines, thus connecting pipelines are reduced, the shock resistance is improved, and the flow distance of the oil path is shortened, thus the control of oil temperature is more accurate. Furthermore, the connector and the fluid cooler can also be connected by connecting elements, which can be realized by providing corresponding ports on the fluid cooler. In addition, besides the arc surface shown in the Figures, the mating surfaces between the connector and the bracket or the fluid cooler can also be flat, or any other shapes as long as the shapes thereof can match with each other to facilitate welded fixation.

In this embodiment, the second pipe 126 and the second hole 108 are arranged substantially coaxially with the external port in communication with the third port 106. The first pipe 125 and the first hole 107 are coaxial, a distance between an axis of the first hole 107 and an axis of the external port in communication with the second port 105 is C, and in other words, the axis of the first hole 107 is deviated from the axis of the external port. Alternatively, the first hole 125 and the first hole 107 are arranged coaxially with the external port in communication with the second port 105, the second pipe 126 is arranged coaxially with the second hole 108, and a distance between an axis of the second hole 108 and an axis of the external port in communication with the third port 106 is C.

In this embodiment, the installation of the first pipe 125 and the second pipe 126 includes the following steps:

providing metal pipes configured to be in clearance fit with right ends of the first hole 107 and the second hole 108, respectively, and placing the metal pipes in the right ends of the first hole 107 and the second 108; and expanding the metal pipes from the inside of the metal pipes, to fixedly mount the first pipe 125 and the second pipe 126 at the right ends of the first hole 107 and the second hole 108.

Figure 2:
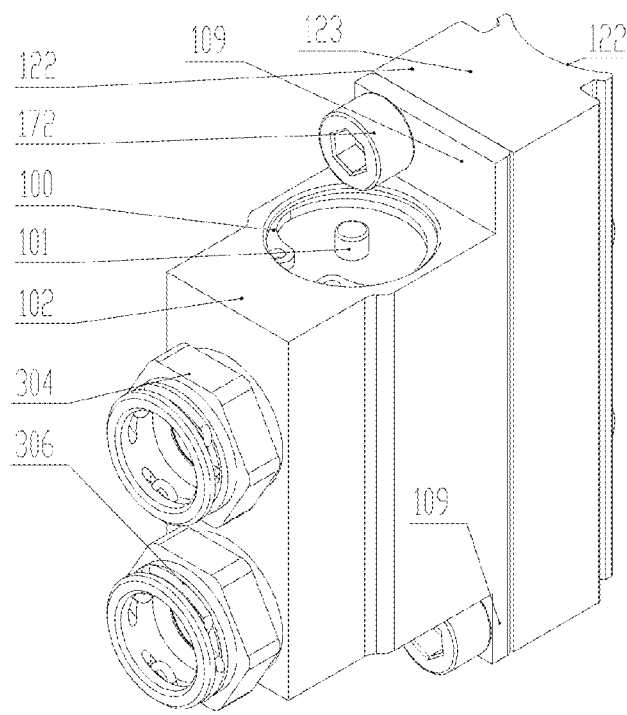
FIG. 2 is a first perspective schematic view of the first embodiment of the thermostatic valve assembly.
Figure 3:
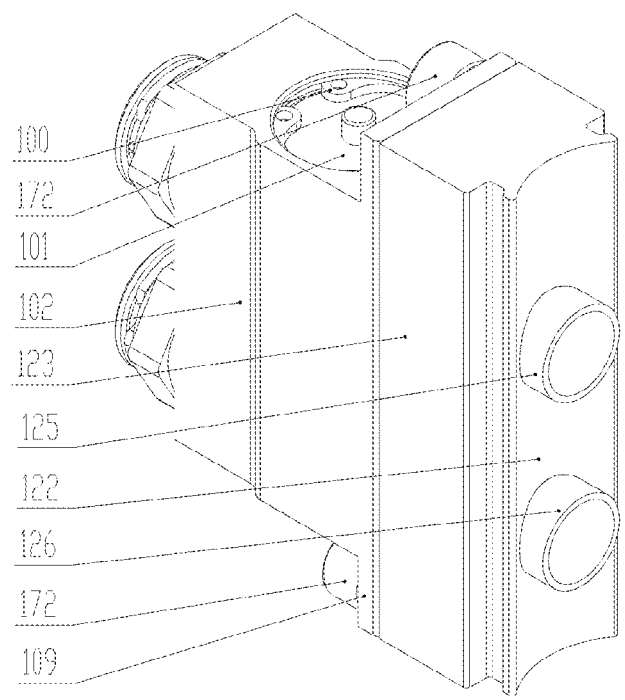
FIG. 3 is a second perspective schematic view of a second embodiment of the thermostatic valve assembly.

Sealing rings, including a first sealing ring 115 and a second sealing ring 116, are, respectively, provided on outer circumferential sides of ends of the external ports of the housing 102. During mounting, after the connector 120 is fixedly mounted, the external ports of the housing 102 are respectively connected to left ends of the first hole 107 and the second hole 108 of the connector 120, and the first sealing ring 115 and the second sealing ring 116 are compressed to guarantee the sealing performance. The thermostatic valve is fixedly connected to the connector 120 via a bolt 172. In this embodiment, the housing 102 of the thermostatic valve is provided with two outward extending portions 109, each of the extending portions 109 has a substantially square structure, and two through hole portions for allowing the bolts to pass through are respectively provided at corresponding positions on the two extending portions 109 close the outer sides, in other words, if the through hole portion of one of the extending portions is provided at an inward part, the through hole portion of the other extending portion is provided at a corresponding outward part; and corresponding parts of the connector are provided with threaded portions, respectively, as shown in FIG. 2. Furthermore, in the bolted connection between the thermostatic valve and the connector, a through hole portion may also be provided on the connector. During the connection, the bolt passes through the through hole portions on the thermostatic valve and the connector to be fixed to the threaded portion on the fluid cooler by threaded connection, for example, the bolt is directly threadedly connected to the threaded portion on the bracket provided on the fluid cooler. Further, the thermostatic valve can also be fixed to the connector by clamping. Furthermore, the sealing rings for realizing the sealing between the external ports of the housing 102 and the first hole 107 and the second hole 108 of the connector 120 can also be provided at a flat part of one of the external port and the respective hole at a portion where the external port and the respective hole are connected, and then the sealing ring is compressed to be deformed, thereby realizing the sealing performance.

The installation of the thermostatic valve assembly includes the following steps:

fixing the connector to the connecting pipes of the fluid cooler or the bracket of the fluid cooler, aligning the first pipe and the second pipe with the connecting pipes of the fluid cooler or mounting holes on the bracket of the fluid cooler, to position the connector, and making the mating surface of the connector to cooperate with the connecting pipe of the fluid cooler or the connecting surface of the bracket of the fluid cooler;

then fixing the connector to the fluid cooler or the bracket of the fluid cooler by welding, and fixing the mating surface of the connector to the connecting pipes of the fluid cooler or the connecting surface of the bracket of the fluid cooler by overall welding; and fixing the thermostatic valve to the connector by the bolts, to fix the thermostatic valve to the fluid cooler.

Such mounting manner of the thermostatic valve assembly is relatively simple, which is different from the existing manner in which the thermostatic valve is connected by pipelines, and has better sealing performance and shock assistance. In the above embodiments, instead of using the first pipe and the second pipe to position the connector, the connector can be firstly positioned and fixed by other positioning structures, and then the two holes of the connector are directly connected to the inlet and the outlet of the fluid cooler by welding, respectively.

There are multiple embodiments of the thermostatic valve, and in the various embodiments of the thermostatic valve according to the present application, the thermostatic valve includes a housing 102 provided with a cavity 112, and a thermostatic actuating element fitted in the cavity 112. The thermostatic actuating element includes a main body 204 in which a thermosensitive substance is provided. The thermostatic valve further includes a piston 205, the piston 205 is slidably mounted at a first end of the main body 204, and has one end protruding out of the main body 204 and another end extending into the main body 204 and abutting against a movable element, such as a rubber tube, at a position where the thermosensitive substance is located. When the thermosensitive substance is heated to expand, the movable element moves to drive the piston to move together. The housing 102 further includes three ports, including a first port 104, a second port 105 and a third port 106, and the first port 104 is in communication with the second port 105 through the cavity 112. When the thermostatic actuating element is heated, the thermosensitive substance expands, thus the main body 204 is moved with respect to the piston 205, or the piston 205 and the main body 204 are moved with respect to each other, thereby moving the main body towards the third port 106. When the thermosensitive substance is heated to a certain extent, the main body moves towards the third port 106, until an abutting portion on the main body abuts against a flat portion of the valve housing at a portion where the valve opening 114 is provided, and in this state, the third port 106 is separated from the first port 104 and the second port 105. In this case, oil entered through the first port 104 cannot directly flow back to the transmission through the third port 106 of the thermostatic valve, but flows through the second port 105 into the fluid cooler connected to the thermostatic valve to be cooled, and then flows back to the transmission through the third port. Similarly, if the oil enters through the third port 106, the oil cannot directly flow to the first port through the third port, but flows from the third port 106 into the fluid cooler connected to the thermostatic valve to be cooled, and then flows back into the thermostatic valve through the second port 106 and then flows back into the transmission through the first port 104.

Figure 8:
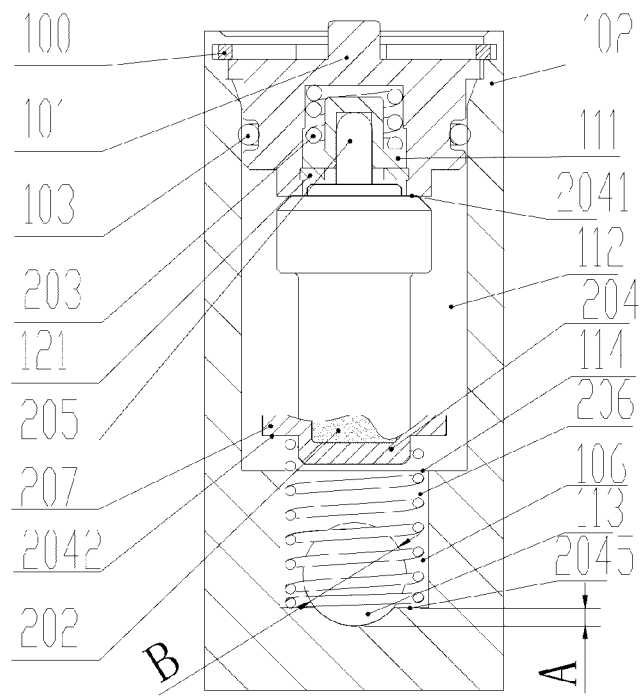
FIG. 8 is a sectional structural schematic view of a first embodiment of the thermostatic valve according to the present application, wherein the third port of the thermostatic valve is in a full open state.
Figure 11:
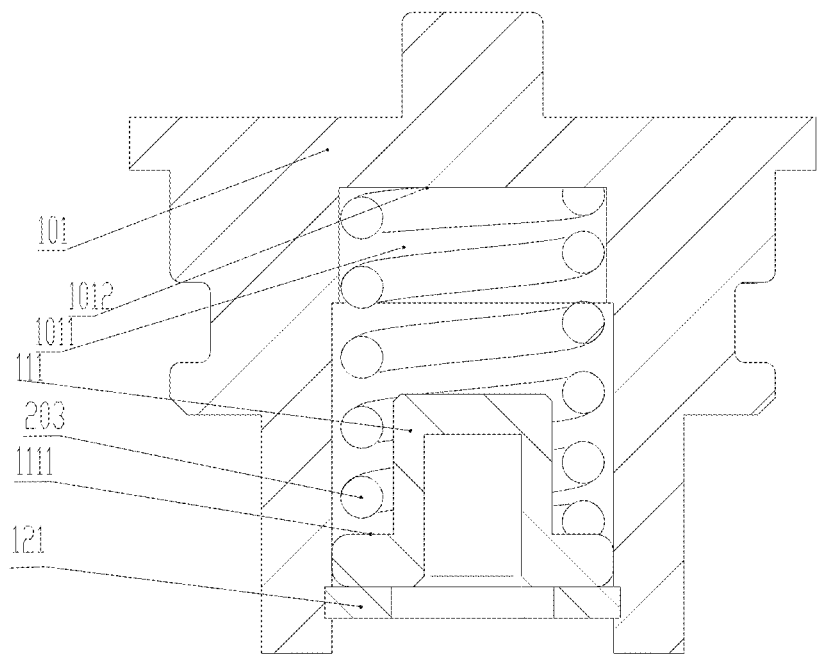
FIG. 11 is a structural schematic view of a cap assembly according to the first embodiment of the thermostatic valve of the present application.

Reference is made to FIGS. 8 and 11, FIG. 8 is sectional structural schematic view of a first embodiment of the thermostatic valve according to the present application, and FIG. 11 is structural schematic view of a cap assembly of the thermostatic valve. The thermostatic valve includes a housing 102, a cap 101, a piston 205 and a main body 204 of a thermostatic actuating element in which a thermosensitve substance 202 is provided. A cavity 112, a third port 106 and a passage 113 are provided in the housing 102. The third port 106 is located below the cavity 112, and has a diameter smaller than a diameter of an upper structure of the cavity 112, thereby forming the valve opening 114 having a stepped structure. The passage 113 is in communication with the third port 106. A circumferential side of the main body 204 of the thermostatic actuating element is provided with a retaining member 207, and the retaining member 207 is fixedly connected to the main body 204 or integrally formed with the main body 204. An outer diameter of the retaining member 207 is greater than an inner diameter of the third port 106, and a second spring 206 in a compressed state is provided in the housing 102. The passage 113 provided in the housing 102 is used for communicating the third port 106 with a corresponding external port. A radius of the third port 106 may be greater than a radius of the passage 113, a distance between a bottom wall 2045 of a space where the third port 106 is located and a bottom of the passage 113 is A, a diameter of the passage 113 is B, wherein $A/B \geq 1/16$. In this way, a situation, that the pressure drop of the oil path communicating two sides of the hole may be unbalanced when the second spring has a large compression amount, can be avoided.

The housing 102 is provided with an open end at a top of the cavity, and the open end is closed by a cap assembly which is hermetically mounted. The cap assembly includes a cap 101, a retainer ring 121 and a spring seat 111. The cap 101 is retained in a groove of the open end of the housing a snap ring 100, and a third sealing ring 103 in a compressed state is provided between the cap 101 and a mounting surface of an inner wall of the housing, to realize the sealing performance. Additionally, the fixation and sealing between the cap and the housing can be realized in other ways. The cap 101 has an open end facing the inside of the cavity 112 and forming a receiving portion 1011, and the first spring 203 and the spring seat 111 are provided in the receiving portion 1011 of the cap 101. The retainer ring 121 is provided at the open end of the cap 101, and the retainer ring 121 is axially limited with respect to the cap 101 by a recess provided in the open end of the cap. During moving, the piston 205 is in pressingly contact with the first spring 203 through the spring seat 111, an abutting surface 111 of the spring seat 111 that faces to the receiving portion of the cap is in pressingly contact with the first spring 203, a surface of the spring seat 111 that faces away from the receiving portion of the cap is in pressingly contact with the retainer ring 121 or the piston, and the other end of the first spring 203 abuts against a bottom wall 1012 of the receiving portion 1011 of the cap. When the thermo-actuated element 202 is heated to expand, the piston first slightly moves towards the spring seat 111 until abutting against the spring seat 111, and then the main body 204 moves towards the third port 106, until the retaining member 207 fixedly provided on the main body 204 abuts against an end surface of the third port at a portion where the valve opening 114 is located, and then the piston 205 moves towards the bottom of the receiving portion 1011 of the cap while abutting against the first spring 203; and when the thermo-actuated element 202 is not heated to expand, the spring seat 111 is fixed by abutting against the retainer ring 121.

Hence, a flat surface of the retaining member 207 for abutting against the valve opening 114 of the third port functions as an abutting portion 2042 of the main body of the thermo-actuated element. The first end of the main body 204 of the thermostatic actuating element is further provided with a limiting portion 2041. When the thermo-actuated element 202 is not heated to expand, the limiting portion 2041 can be in pressingly contact with the end surface of the open end of the cap 101, so as to be positioned. The other end of the main body 204 of the thermostatic actuating element is provided with a second spring 206 in a compressed state. The second spring 206 has one end abutting against the retaining member 207 or a positioning surface of the main body, and another end abutting against the bottom wall or the abutting surface of the space where the third port 106 is located. In this embodiment, the retaining member 207 is integrally formed with the main body 204, which can guarantee a small inner leakage in the sealing state.

An initial deformation force of the first spring 203 is greater than or equal to a pressure applied to the second spring 206 when the third port 106 is closed. Therefore, when the thermosensitive substance in the thermostatic actuating element is heated to expand, the main body 204 of the thermostatic actuating element is first moved towards the third port 106 until the retaining member 207 comes into contact with the inward valve opening 114 of the third port, and at this time, the third port 106 is separated from the first port and the second port by the retaining member 207 and is no longer in communication with the first port and the second port. Thereafter, in order to prevent the thermosensitive substance from continuing to expand to cause the piston 205 to penetrate an elastic component in the thermo-actuated element, the first spring 203 is provided in the cap 101, and the initial deformation force of the first spring 203 is greater than or equal to the elastic force of the second spring 206 when the third port 106 is closed. When the third port 106 is closed, a force caused by the continuous expansion of the thermosensitive substance deforms the first spring 203. In this case, the piston drives the spring seat 111 to move together towards the bottom of the receiving portion 1011 of the cap, to further compress the first spring 203. Thus, the force acting on the elastic component in the thermostatic actuating element from the piston 205 can be reduced, which prolongs the service life of the thermo-actuated element.

The first spring 20 provided in the cap according to the present application can lower the requirements of the thermostatic valve on the designer and the performance of spring, lower the manufacturing requirements on parts, and improve the qualified rate of the assembly in manufacturing and assembling process. Compared to the conventional design with a movable cap and two springs at two sides of the cap, the cap assembly according to the present application makes the design, manufacture and assembly of the thermostatic valve simpler. Further, the cap assembly according to the present application prolongs the service life of the thermostatic valve. Besides the spiral spring shown in drawings, the first spring can also be an elastic element with other structures, such as a leaf spring.

Moreover, the spring seat 111 may have a flat plate shape or a straw hat shape. When the spring seat 111 is of the straw hat shape, an end portion of the protruding end of the piston is located inside an inwardly concave cavity of the spring seat 111, and two sides or one side of a brim of the spring seat 111 may be provided with a notch portion to balance the pressure of fluid at the two sides thereof. When the spring seat 111 is of the flat plate shape, the end portion of the protruding end of the piston is configured to abut against the flat surface of the spring seat 111 during the moving process, and a through hole or a notch can be provided on a flat plate portion of the spring seat 111 to balance the pressure of fluid at the two sides thereof. In the present application, it is required to enable the end portion of the protruding end of the piston to abut against the spring seat 111 during the moving process, such that the spring seat 111 can reciprocate under the action of the piston 205 and the elastic force of the first spring.

Figure 12:
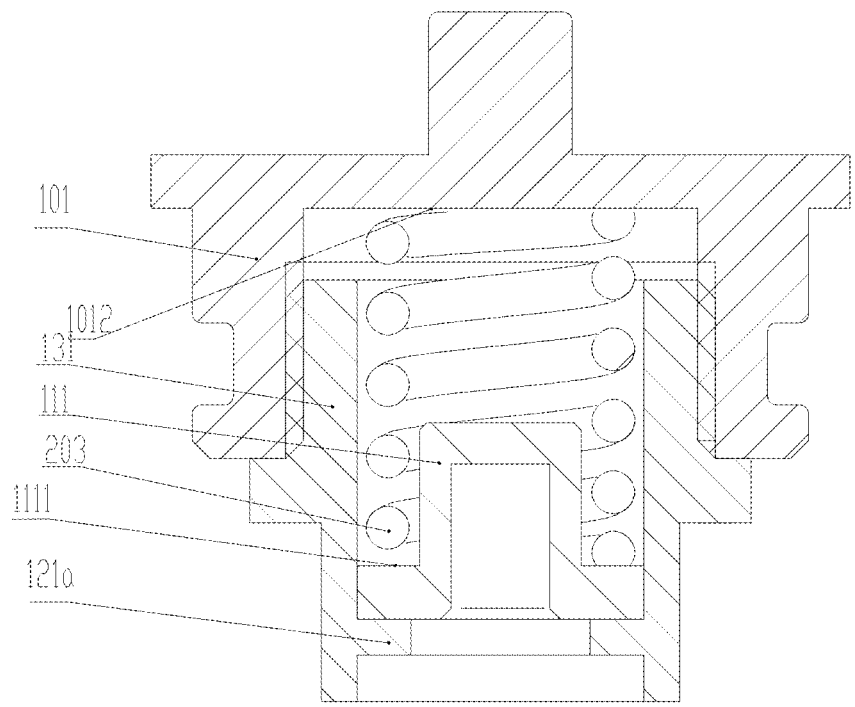
FIG. 12 is a structural schematic view of a cap assembly according to the second embodiment of the thermostatic valve of the present application.

The cap assembly can also have a structure shown in FIG. 12. In this structure of the cap assembly, the cap assembly includes a cap 101, a retaining member 131, and a spring seat 111. The spring seat 111 has a straw hat shape, an end portion of the protruding end of the piston is located in a cavity of the spring seat 111. The cap 101 is provided with a threaded portion. Furthermore, the retaining member 131 has an integrated structure with a position limiting portion 121a. The retaining member 131 is provided at the open end of the cap 101 and is fixedly connected to the cap 101 through threads. The retaining member 131 is of a substantially cylinder shape with two open ends. The first spring 203 has one end pressingly connected to a bottom wall 1012 of the receiving portion of the cap 101, and another end pressingly connected to an abutting surface 1111 of the spring seat 111, and the spring seat 111 is in pressingly contact with the position limiting portion 121a or the piston. During assembling, the spring seat 111 and the first spring 203 are first mounted into the retaining member 131, and then the retaining member 131 is fixedly connected to the cap 101. Furthermore, the piston 205 and the spring seat 111 can be formed integratedly or separately. The position limiting portion 121a and the retaining member 131 can be formed integratedly or can be separately manufactured and then assembled together, which will not be described in detail herein.

Figure 9:
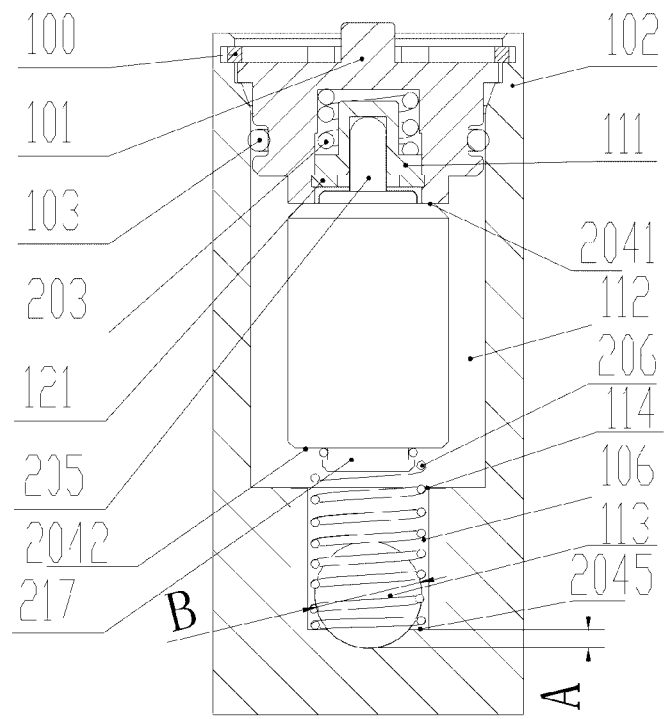
FIG. 9 is a sectional structural schematic view of a second embodiment of the thermostatic valve according to the present application, wherein the third port of the thermostatic valve is in a full open state.

In a second embodiment and a third embodiment of the thermostatic valve, one end of the second spring 206 abuts against an abutting surface of the second end of the main body 204 of the thermo-actuated element, and the other end of the second spring 206 is in pressingly contact with the bottom wall of the third port 106 of the housing 102 or an abutting surface provided on the housing 102. In the second embodiment of the thermostatic valve shown in FIG. 9, a spring mounting portion 217 is provided at the second end of the main body 204 of the thermo-actuated element, a flat portion is provided between an outer side wall of the main body 204 of the thermostatic actuating element and the spring mounting portion 217 and functions as an abutting portion 2042. The spring mounting portion 217 is configured to limit the second spring in a radial direction, and a flat contacting portion of the abutting portion 2042 on the main body 204 of the thermostatic actuating element is configured to limit the second spring in an axial direction. The diameter of the outer side wall of the main body 204 of the thermostatic actuating element is greater than the inner diameter of the third port 106, the outer diameter of the spring mounting portion 217 is smaller than the inner diameter of the third port 106, and one end of the second spring 206 is mounted on the spring mounting portion 217, and the other end thereof is in pressingly contact with a bottom wall 2045 of the third port 106 of the housing 102. When the thermostatic actuating element is heated to expand, the piston first comes into contact with the spring seat, and then the main body 204 is driven by the thermosensitive substance to move towards the third port 106 until the abutting portion 2042 of the main body 204 abuts against the third port at a portion where the inward valve opening 114 is located. When the thermosensitive substance continues to expand, the piston 205 move upwards, and the first spring 203 begins to be compressed. Similarly, the initial deformation force of the first spring 203 is greater than or equal to a pressure applied to the second spring 206 when the abutting portion 2042 of the main body 204 is moved to a position abutting against the third port at the portion where the inward valve opening 114 is located. When the thermostatic actuating element is heated, the main body 204 first is moved downwards until the third port 106 is closed, and only after the third port 106 is closed, the force generated by the expansion of the thermosensitive substance of the thermostatic actuating element when being heated is enough to continue to compress the first spring 203.

Figure 10:
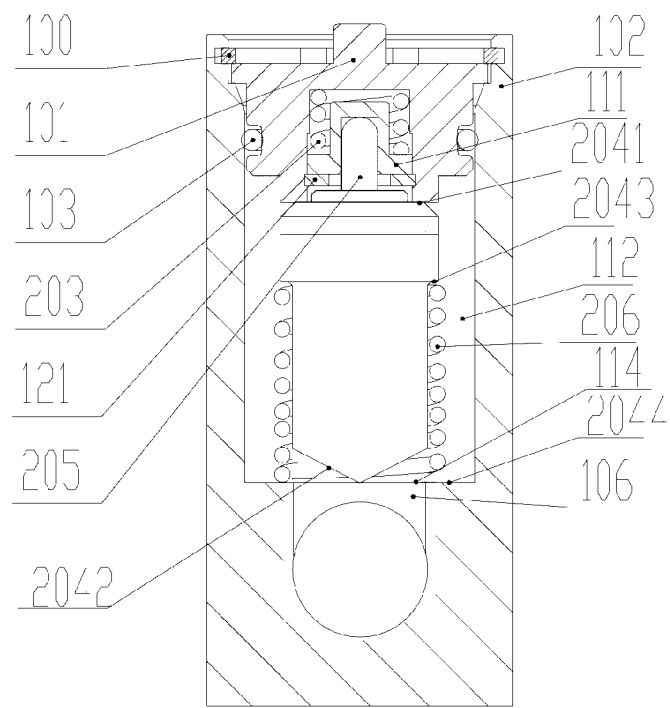
FIG. 10 is a sectional structural schematic view of a third embodiment of the thermostatic valve according to the present application, wherein the third port of the thermostatic valve is in a full open state.

A distance from the bottom wall 2045 of the third port 106 to the bottom of the passage 113 is A, a diameter of the passage 113 is B, and a ratio of A to B satisfies the expression: $A/B \geq 1/16$. In the third embodiment of the thermostatic valve shown in FIG. 10, the main body 204 of the thermostatic actuating element has a stepped cylindrical shape, and a first end thereof has an outer diameter greater than an outer diameter of a second end thereof. A second spring 206 is sleeved on the second end of the main body 204 of the thermostatic actuating element and has an inner diameter smaller than the outer diameter of the first end of the main body 204 of the thermo-actuated element. A diameter of an outer side wall of the second end of the main body 204 of the thermostatic actuating element is greater than the inner diameter of the third port 106. One end of the second spring 206 abuts against a stepped shoulder portion 2043 formed between the first end and the second end of the main body 204, and the other end of the second spring 206 is in pressingly contact with the inner wall 2044 of the housing 102 at a flat surface where the valve opening 114 is located. When the thermostatic actuating element is heated, after the piston abuts against the spring seat, the main body moves towards the third port 106 until the abutting portion 2042 provided on the main body abuts against the portion where the valve opening 114 is located, thereby separating the third port 106 from the first port and the second port. Additionally, in order to ensure a certain transition flow before the third port is closed, a circumferential side of the end portion of the second end of the main body 204 of the thermostatic actuating element can be chamfered, or the end portion of the second end of the main body 204 of the thermostatic actuating element can be arranged to have a frustum shape. With such structure, the flow area of the fluid through the third port 106 can be increased when the main body 204 is close to the third port 106 but does not completely block the third port 106.

Moreover, in the embodiments described above, the first spring of the thermostatic valve is provided in the inwardly concave receiving portion at the open end of the cap, and this structure has advantages that the structure is relatively compact, and the assembly is convenient. However, the present application is not limited to this, the cap may not have the inwardly concave open end, the first spring may be a leaf spring, and the leaf spring is provided at a side of the cap that faces the cavity, and the piston directly abuts against the leaf spring or abuts against the leaf spring via other components. After the main body moves towards the third port to a position abutting against a flat surface where the valve opening is located, the main body cannot move, and then the piston moves towards the cap while abutting against the leaf spring, thus in this way, the purpose of the present application can also be realized.

Figure 13:
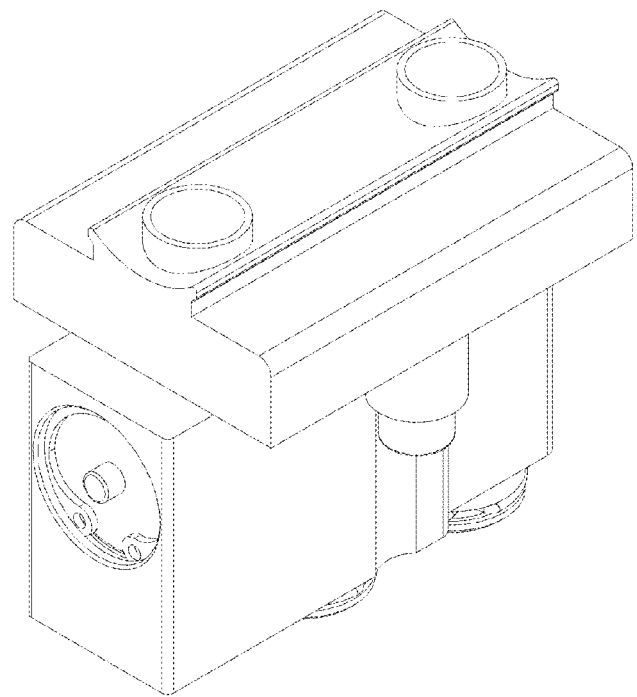
FIG. 13 is a perspective schematic view showing the thermostatic valve being assembled with the connector according to the second embodiment of the thermostatic valve assembly of the present application.
Figure 14:
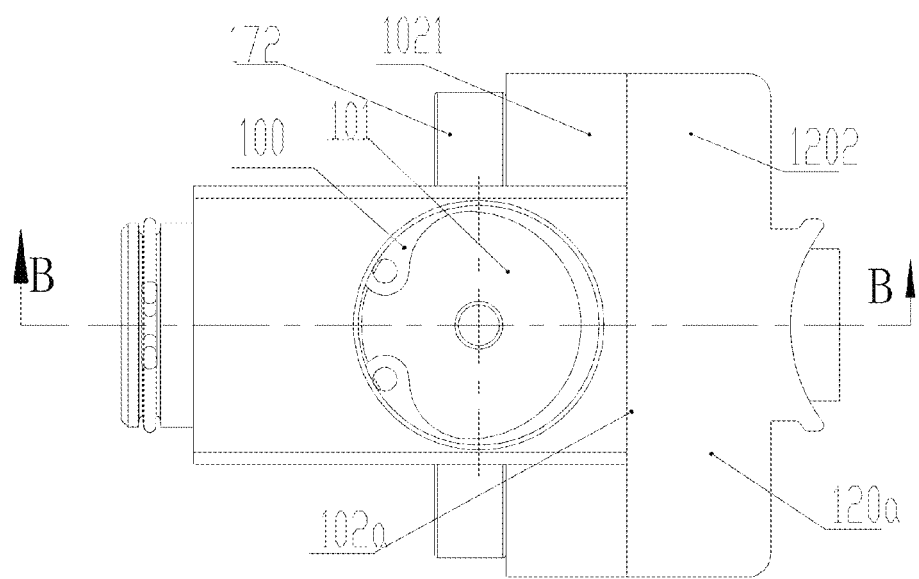
FIG. 14 is a structural schematic view showing the second embodiment of the thermostatic valve assembly of the present application, wherein the thermostatic valve is assembled with the connector.
Figure 15:
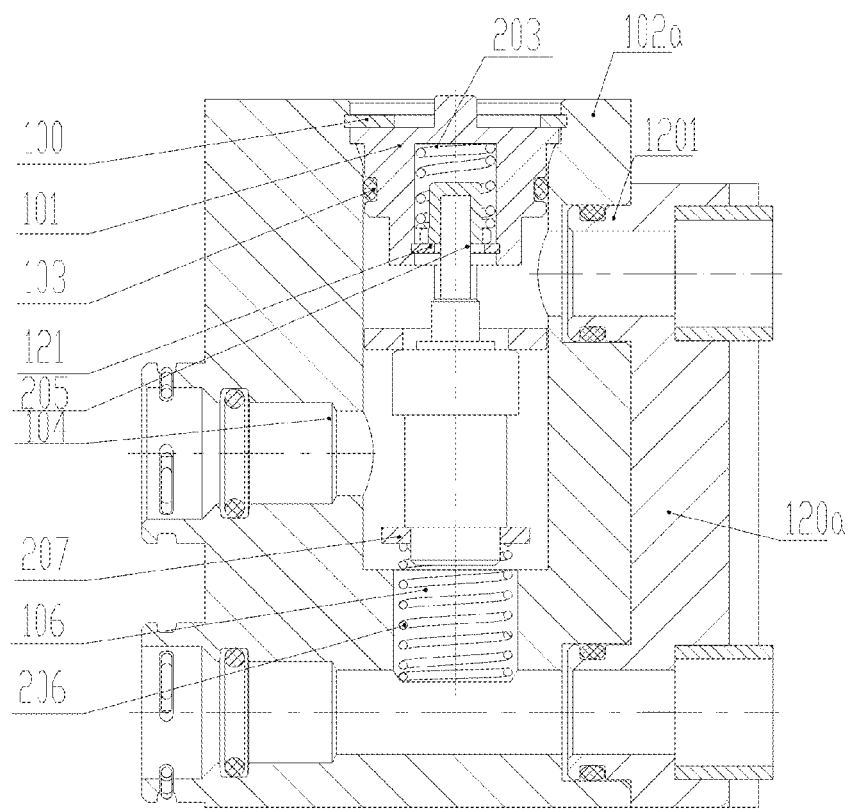
FIG. 15 is a sectional structural schematic view of the thermostatic valve assembly in FIG. 14 taken along line B-B.

Hereinafter, another thermostatic valve assembly according to the present application is described. Reference is made to FIGS. 13 to 15, FIG. 13 is a perspective schematic view showing the first embodiment of the thermostatic valve assembly of the present application, FIG. 14 is a structural schematic view showing the second embodiment of the thermostatic valve assembly of the present application, and FIG. 15 is a sectional structural schematic view of the thermostatic valve assembly taken along line B-B. The main difference between the first embodiment of the thermostatic valve assembly described above and this embodiment is the manner for fixedly connecting the connector 120a with the housing 102a of the thermostatic valve. Two inwardly concave mating holes are provided at an end of the housing 102a that is configured to be connected to the connector 120a, and two outwardly convex connecting portions 1201 are provided at corresponding portions of the connector 120a. An outer side of the connecting portion 1201 is provided with a groove for receiving a sealing ring, and the connecting portion 1201 can protrude into the inwardly concave mating hole of the housing 102a. During assembling, the connector 120a can be first fixed to the fluid cooler, and then the thermostatic valve is fixedly connected to the connector. Furthermore, in this embodiment, an extending portion 1202 for fixation is provided on the connector 120a in a transverse direction, and correspondingly, a transverse extending portion 1021 is also provided on the housing 102a at a corresponding portion, and the extending portion 1021 is provided with a fixing hole allowing a bolt to pass through, thus the connector and the housing can be fixedly connected by the bolt or a pressing plate. In another embodiment, the housing 102 has other two connecting members for connection with a system, and the other two connecting members are integrally formed with the housing.

Figure 16:
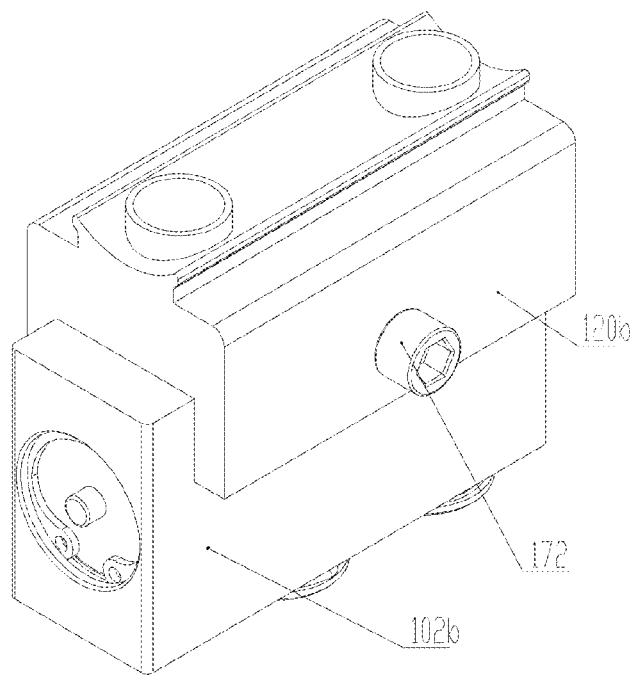
FIG. 16 is a schematic view showing the third embodiment of the thermostatic valve assembly according to the present application, wherein the thermostatic valve is assembled with the connector.

The third thermostatic valve assembly according to the present application is described below. Referring to FIG. 16, the main difference between this structure and the second embodiment of the thermostatic valve assembly described above is the manner for fixedly connecting the connector 120b with the housing 102b of the thermostatic valve. A bolt 172 passes through the side wall of the connector 120b to be fixed to the main body of the thermostatic valve. In addition, the bolt 172 may also pass through the side wall at one side of the connector 120b and the main body of the thermostatic valve and then is fixed to the side wall at the other side of the connector 120b.

Finally, it should be noted that the above embodiments are only intended to illustrate the present application and are not intended to limit the present application. Thus, although the present description has been described in detail with reference to the above embodiments of the present application, however, it should be understood by those skilled in the art, modifications or equivalent substitutions may be made to the present application by those skilled in the art. All of technical solutions and improvements thereof without departing from the spirit and scope of the present application are deemed to fall in the scope of the present application defined by the claims.

The invention claimed is:

1. A thermostatic valve, comprising a housing in which a cavity is provided, and a thermostatic actuating element mounted in the cavity, wherein the thermostatic actuating element comprises a main body in which a thermosensitive substance is provided; the thermostatic valve further comprises a piston slidably mounted at one end of the main body, and one end of the piston protrudes out of the main body; the housing further comprises three ports, comprising a first port, a second port and a third port, wherein the first port is in communication with the second port through the cavity, and the third port is selectively in communication with the first port and the second port; the housing is provided with an open end which is closed by a cap assembly; the thermostatic valve further comprises a first elastic element and a second elastic element, wherein the first elastic element is provided on the cap assembly or at a side close to the cap assembly, and the first elastic element has one end abutting against the cap assembly, and another end directly abutting against or indirectly abutting against the piston at least during a moving process; the second elastic element is provided at the third port or at a side close to the third port, and the second elastic element has one end abutting against an inner wall or a bottom wall of the cavity of the housing, and another end abutting against the main body, and an initial deformation force of the first elastic element is greater than or equal to a pressure applied to the second elastic element when the main body abuts against the housing at a portion where the third port is provided; in a case that the thermostatic actuating element is heated, the thermosensitive substance expands, and after the piston directly abuts against or indirectly abuts against the first elastic element, the main body is moved with respect to the piston, that is moving towards the third port, until an abutting portion of the main body abuts against the housing at the portion where the third port is provided, and then the piston compresses the first elastic element and moves towards the cap assembly.

2. The thermostatic valve according to claim 1, wherein the cap assembly is provided with an open end as a receiving portion, the open end faces the cavity of the housing, and the first elastic element is provided in the receiving portion of the cap assembly; the cap assembly comprises a spring seat, and a position limiting portion which is axially positioned, and the position limiting portion is arranged at the open end of the cap assembly at a position close to an end portion of the open end; the other end of the first elastic element abuts against the spring seat, a surface of the spring seat that is away from the receiving portion is in pressingly contact with the position limiting portion or the piston; and during the moving process, the piston is in contact with the first elastic element via the spring seat.

3. The thermostatic valve according to claim 2, wherein a passage is provided in the housing to communicate the third port with a corresponding external port; a retaining member is provided on the main body, and the retaining member is integrally formed with the main body or fixedly provided on the main body, the retaining member protrudes out of a base portion of the main body, the abutting portion of the main body is a flat surface of the retaining member that faces the third port; and the main body abuts against the third port refers to that the retaining member abuts against a portion where a valve opening of an inward end of the third port is located, to close the third port and separate the external port in communication with the third port from the first port and the second port.

4. The thermostatic valve according to claim 2, wherein a passage is provided in the housing to communicate the third port with a corresponding external port; the main body of the thermostatic actuating element is provided with a spring mounting portion at a second end, a flat surface portion is provided between an outer side wall of the main body and the spring mounting portion and functions as an abutting portion, the spring mounting portion is configured to radially limit the second elastic element, and a planar contacting portion of the abutting portion on the main body is configured to axially limit the second elastic element; a diameter of the outer side wall of the main body is greater than an inner diameter of the third port, and outer diameters of the second elastic element and the spring mounting portion are both smaller than the inner diameter of the third port; the second elastic element has one end mounted on the spring mounting portion, and another end extending into the third port of the housing and in pressingly contact with an inner wall or a bottom wall of the housing; and when the abutting portion of the main body abuts against a portion where an inward end opening of the third port is located, the third port is closed by the main body, and the external port in communication with the third port is separated from the first port and the second port.

5. The thermostatic valve according to claim 2, wherein the cap assembly comprises a cap, a retainer ring and the spring seat; the open end of the housing is sealed by the cap, and the cap is retained in a groove of the open end of the housing via a snap ring; an end of an end cover that faces the cavity is opened to form the receiving portion, and the first spring element and the spring seat are provided in the receiving portion; the position limiting portion is the retainer ring which is provided at the open end of the cap and is axially limited with respect to the cap via a groove provided in the open end of the cap; the spring seat has a flat plate shape or a straw hat shape, and in a case that the spring seat has the flat plate shape, the piston abuts against a flat surface of the flat plate shape during the moving process; and in case that the spring seat has the straw hat shape, an end portion of the protruding end of the piston is located in an inwardly concave cavity of the spring seat.

6. The thermostatic valve according to claim 5, wherein a passage is provided in the housing to communicate the third port with a corresponding external port; a retaining member is provided on the main body, and the retaining member is integrally formed with the main body or fixedly provided on the main body, the retaining member protrudes out of a base portion of the main body, the abutting portion of the main body is a flat surface of the retaining member that faces the third port; and the main body abuts against the third port refers to that the retaining member abuts against a portion where a valve opening of an inward end of the third port is located, to close the third port and separate the external port in communication with the third port from the first port and the second port.

7. The thermostatic valve according to claim 5, wherein a passage is provided in the housing to communicate the third port with a corresponding external port; the main body of the thermostatic actuating element is provided with a spring mounting portion at a second end, a flat surface portion is provided between an outer side wall of the main body and the spring mounting portion and functions as an abutting portion, the spring mounting portion is configured to radially limit the second elastic element, and a planar contacting portion of the abutting portion on the main body is configured to axially limit the second elastic element; a diameter of the outer side wall of the main body is greater than an inner diameter of the third port, and outer diameters of the second elastic element and the spring mounting portion are both smaller than the inner diameter of the third port; the second elastic element has one end mounted on the spring mounting portion, and another end extending into the third port of the housing and in pressingly contact with an inner wall or a bottom wall of the housing; and when the abutting portion of the main body abuts against a portion where an inward end opening of the third port is located, the third port is closed by the main body, and the external port in communication with the third port is separated from the first port and the second port.

8. The thermostatic valve according to claim 2, wherein the cap assembly comprises a cap, a retaining member and the spring seat; an end of the cap that faces the cavity is opened, and the spring seat has a straw hat shape; the retaining member has an approximately cylindrical shape with two open ends, and the retaining member has an integrated structure with a position limiting portion; the retaining member is provided at the open end of the cap and is fixedly connected to the cap through threads to form the receiving portion, and the first elastic element and the spring seat are arranged in the receiving portion; and the first elastic element has one end pressingly connected to a bottom wall of the open end of the cap, and another end pressingly connected to an abutting surface of the spring seat, and the spring seat is in pressingly contact with the position limiting portion or the piston.

9. The thermostatic valve according to claim 8, wherein a passage is provided in the housing to communicate the third port with a corresponding external port; a retaining member is provided on the main body, and the retaining member is integrally formed with the main body or fixedly provided on the main body, the retaining member protrudes out of a base portion of the main body, the abutting portion of the main body is a flat surface of the retaining member that faces the third port; and the main body abuts against the third port refers to that the retaining member abuts against a portion where a valve opening of an inward end of the third port is located, to close the third port and separate the external port in communication with the third port from the first port and the second port.

10. The thermostatic valve according to claim 8, wherein a passage is provided in the housing to communicate the third port with a corresponding external port; the main body of the thermostatic actuating element is provided with a spring mounting portion at a second end, a flat surface portion is provided between an outer side wall of the main body and the spring mounting portion and functions as an abutting portion, the spring mounting portion is configured to radially limit the second elastic element, and a planar contacting portion of the abutting portion on the main body is configured to axially limit the second elastic element; a diameter of the outer side wall of the main body is greater than an inner diameter of the third port, and outer diameters of the second elastic element and the spring mounting portion are both smaller than the inner diameter of the third port; the second elastic element has one end mounted on the spring mounting portion, and another end extending into the third port of the housing and in pressingly contact with an inner wall or a bottom wall of the housing; and when the abutting portion of the main body abuts against a portion where an inward end opening of the third port is located, the third port is closed by the main body, and the external port in communication with the third port is separated from the first port and the second port.

11. The thermostatic valve according to claim 1, wherein a passage is provided in the housing to communicate the third port with a corresponding external port; a retaining member is provided on the main body, and the retaining member is integrally formed with the main body or fixedly provided on the main body, the retaining member protrudes out of a base portion of the main body, the abutting portion of the main body is a flat surface of the retaining member that faces the third port; and the main body abuts against the third port refers to that the retaining member abuts against a portion where a valve opening of an inward end of the third port is located, to close the third port and separate the external port in communication with the third port from the first port and the second port.

12. The thermostatic valve according to claim 11, wherein a distance from a bottom of the third port to a bottom of the passage is A, a diameter of the passage is B, and the relationship between A and B satisfies the expression: $A/B \geq 1/16$.

13. The thermostatic valve according to claim 1, wherein a passage is provided in the housing to communicate the third port with a corresponding external port; the main body of the thermostatic actuating element is provided with a spring mounting portion at a second end, a flat surface portion is provided between an outer side wall of the main body and the spring mounting portion and functions as an abutting portion, the spring mounting portion is configured to radially limit the second elastic element, and a planar contacting portion of the abutting portion on the main body is configured to axially limit the second elastic element; a diameter of the outer side wall of the main body is greater than an inner diameter of the third port, and outer diameters of the second elastic element and the spring mounting portion are both smaller than the inner diameter of the third port; the second elastic element has one end mounted on the spring mounting portion, and another end extending into the third port of the housing and in pressingly contact with an inner wall or a bottom wall of the housing; and when the abutting portion of the main body abuts against a portion where an inward end opening of the third port is located, the third port is closed by the main body, and the external port in communication with the third port is separated from the first port and the second port.

14. The thermostatic valve according to claim 13, wherein a distance from a bottom of the third port to a bottom of the passage is A, a diameter of the passage is B, and the relationship between A and B satisfies the expression: $A/B \geq 1/16$.

15. The thermostatic valve according to claim 1, wherein a passage is provided in the housing to communicate the third port with a corresponding external port; the main body has a stepped cylindrical shape, and an outer diameter of a first end of the main body is greater than an outer diameter of a second end of the main body; the second elastic element is sleeved on the second end of the main body of the thermo-actuated element, a diameter of an outer side wall of the second end of the main body is greater than an inner diameter of the third port, the second elastic element has one end abutting against a stepped shoulder portion formed between the first end and the second end of the main body, and another end in pressingly contact with an inner wall of the housing at a position where the third port is located; a circumferential side of an end portion of the second end of the main body is chamfered or the end portion of the second end of the main body is a frustum; an end portion, facing the third port, of the second end of the main body functions as the abutting portion; and in a case that the thermostatic actuating element is heated, when the abutting portion of the main body abuts against a portion where an inward valve opening of the third port is located, the third port is closed by the main body, and the external port in communication with the third port via the passage is separated from the first port and the second port.

16. The thermostatic valve according to claim 1, wherein the cap assembly comprises a cap, a retainer ring and a spring seat; the open end of the housing is sealed by the cap, and the cap is retained in a groove of the open end of the housing via a snap ring; an end of an end cover that faces the cavity is opened to form the receiving portion, and the first spring element and the spring seat are provided in the receiving portion; the position limiting portion is the retainer ring which is provided at the open end of the cap and is axially limited with respect to the cap via a groove provided in the open end of the cap; the spring seat has a flat plate shape or a straw hat shape, and in a case that the spring seat has the flat plate shape, the piston abuts against a flat surface of the flat plate shape during the moving process; and in case that the spring seat has the straw hat shape, an end portion of the protruding end of the piston is located in an inwardly concave cavity of the spring seat.

17. The thermostatic valve according to claim 1, wherein the cap assembly comprises a cap, a retaining member and a spring seat; an end of the cap that faces the cavity is opened, and the spring seat has a straw hat shape; the retaining member has an approximately cylindrical shape with two open ends, and the retaining member has an integrated structure with a position limiting portion; the retaining member is provided at the open end of the cap and is fixedly connected to the cap through threads to form the receiving portion, and the first elastic element and the spring seat are arranged in the receiving portion; and the first elastic element has one end pressingly connected to a bottom wall of the open end of the cap, and another end pressingly connected to an abutting surface of the spring seat, and the spring seat is in pressingly contact with the position limiting portion or the piston.

18. A thermostatic valve assembly, comprising a thermostatic valve, a connector and a fluid cooler, wherein the thermostatic valve is fixedly connected to the fluid cooler via the connector; the connector comprises a mating portion, a surface of a side of the mating portion that is connected to the fluid cooler has a shape matching with a shape of a corresponding fitting mounting part of the fluid cooler; the connector is hermetically fixed to the fluid cooler by welding, and the thermostatic valve is fixedly connected to the connector through a bolt, to fixedly connect the thermostatic valve to the fluid cooler; the thermostatic valve comprises a housing in which a cavity is provided, and a thermostatic actuating element mounted in the cavity, wherein the thermostatic actuating element comprises a main body in which a thermosensitive substance is provided; the thermostatic valve further comprises a piston slidably mounted at one end of the main body, and one end of the piston protrudes out of the main body; the housing further comprises three ports, comprising a first port, a second port and a third port, wherein the first port is in communication with the second port through the cavity, and the third port is selectively in communication with the first port and the second port; the housing is provided with an open end which is closed by a cap assembly; the thermostatic valve further comprises a first elastic element and a second elastic element, wherein the first elastic element is provided on the cap assembly or at a side close to the cap assembly, and the first elastic element has one end abutting against the cap assembly, and another end directly abutting against or indirectly abutting against the piston at least during a moving process; the second elastic element is provided at the third port or at a side close to the third port, and the second elastic element has one end abutting against an inner wall or a bottom wall of the cavity of the housing, and another end abutting against the main body, and an initial deformation force of the first elastic element is greater than or equal to a pressure applied to the second elastic element when the main body abuts against a portion where an inward valve opening of the third port is provided; in a case that the thermostatic actuating element is heated, the thermosensitive substance expands, and after the piston directly abuts against or indirectly abuts against the first elastic element, the main body is moved with respect to the piston, and the main body moves towards the third port until an abutting portion of the main body abuts against an end surface of the housing at a portion where the third port is provided, and then the piston compresses the first elastic element and moves towards the cap assembly.

19. The thermostatic valve assembly according to claim 18, wherein the connector is provided with two connecting through holes, and the two connecting through holes comprises a first hole and a second hole; a side of the connector that is connected to the fluid cooler is provided with connecting pipes connecting the fluid cooler with the connector, and the connecting pipes comprises a first pipe and a second pipe; the first pipe and the second pipe are both metal pipes, one end of the first pipe is fixedly mounted at a right end of the first hole, one end of the second pipe is fixedly mounted at a right end of the second hole, and after the first pipe and the second pipe are inserted into the connector, the first pipe and the second pipe are internally expanded to be fixed.

20. The thermostatic valve assembly according to claim 18, wherein the connector and the fluid cooler are fixedly connected via a bracket fixedly provided on the fluid cooler; the surface of the side of the mating portion of the connector that is connected to the fluid cooler is arc shaped, a radius of the arc shape is 0.2 to 0.4 mm greater than a radius of a corresponding arc portion of the bracket fixed on the fluid cooler; and during assembling, the connector is first fixedly mounted on the bracket by arranging the arc mating surface of the mating portion of the connector close to a connecting surface of the bracket, fixing the mating surface to the connecting surface of the bracket by welding, and fixing the first pipe and the second pipe to the bracket or the fluid cooler by welding.

* * * * *